March 8, 1966 H. E. RIORDAN ETAL 3,238,793
TWO-AXIS HYDRAULICALLY CONTROLLED INERTIAL GUIDANCE PLATFORM
Filed Nov. 7, 1961 2 Sheets-Sheet 2

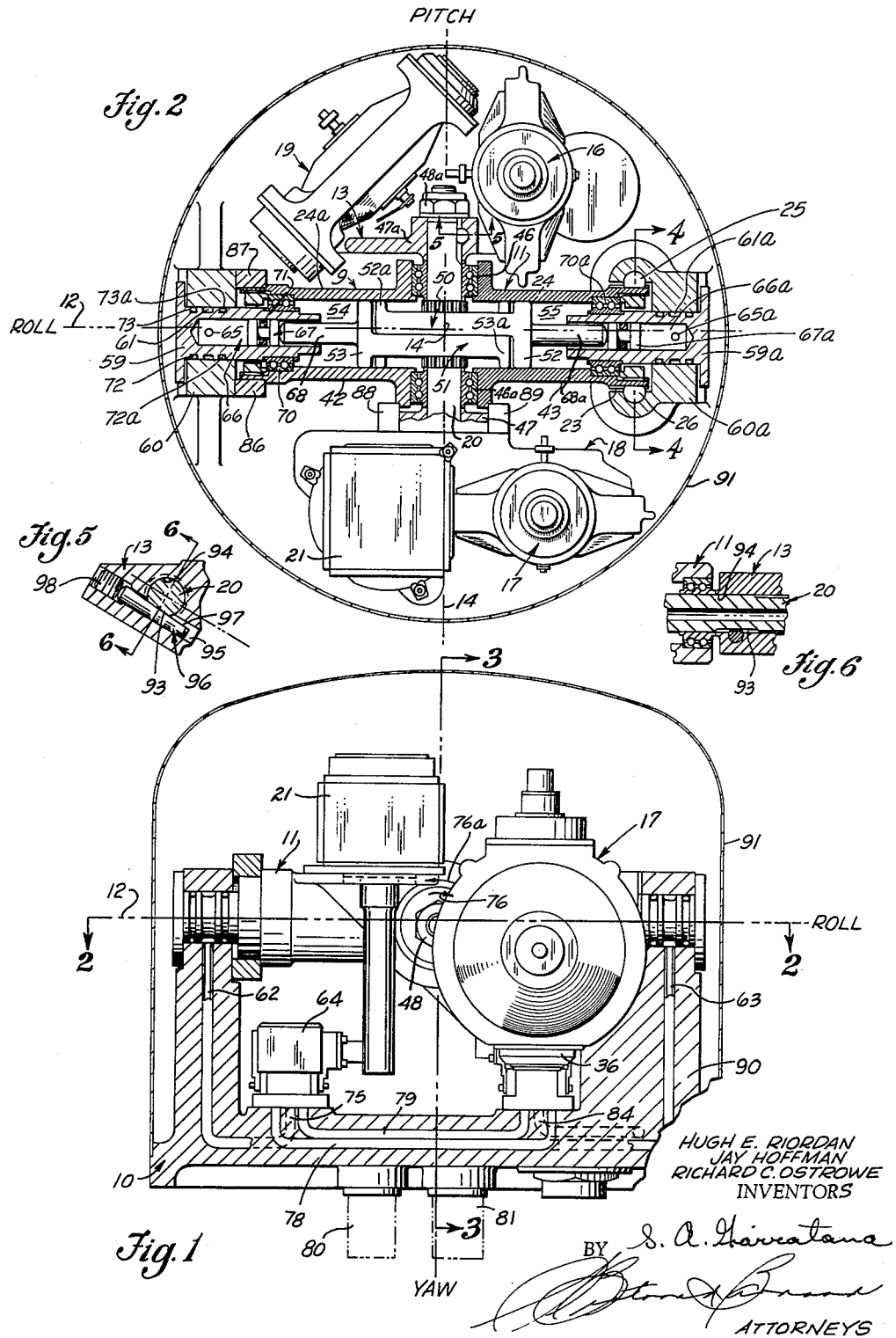

HUGH E. RIORDAN
JAY HOFFMAN
RICHARD C. OSTROWE
INVENTORS

BY

ATTORNEYS

United States Patent Office 3,238,793
Patented Mar. 8, 1966

3,238,793
TWO-AXIS HYDRAULICALLY CONTROLLED
INERTIAL GUIDANCE PLATFORM
Hugh E. Riordan, Wyckoff, Jay Hoffman, Livingston, and Richard C. Ostrowe, Clifton, N.J., assignors to General Precision Inc., Little Falls, N.J., a corporation of Delaware
Filed Nov. 7, 1961, Ser. No. 150,748
9 Claims. (Cl. 74—5.34)

This invention relates to inertial guidance platforms and is particularly directed to platforms, in which two or more gyros are mounted on multiple gimbals, the gimbals being adjustable in two planes to stabilize the platform about two axes perpendicular to one another, in order to provide a continuous and accurate indication of the attitude of an airplane in flight.

In the conventional type of inertial navigation platform, two or more gyros, and one or more accelerometers are mounted on a platform, which is supported by a plurality of gimbals, provision being made to obtain signals from pick-offs attached to the individual gyros to indicate the momentary attitude of each gyro, and the gimbals, by which it is supported.

The signals obtained from the gyro pick-offs are fed to a synchro servo system in which individual servo motors are used to rotate and adjust the individual gimbals about two axes perpendicular to one another, in order to restore each gimbal to its nominal position regardless of the attitude of the airplane at a particular time interval.

Due to the continuous change in position of the individual gyros mounted on the platform, a system of slip rings is usually attached to the gimbals, individual brushes used in conjunction with the slip rings being provided to provide signals, which are usually amplified, and transmitted to the individual servo motors used to control the angular position or attitude of each gimbal about one axis.

The slip ring and brush combination is relatively costly, and tends to go out of order frequently, particularly where the platform is subjected to shock loads.

Due to the limited capacity of the servos used to move the gimbals, it is necessary to support the gimbals on extremely accurate, high-cost, low-friction bearings.

It is further necessary to individually balance the gimbals to a high degree of accuracy in order to reduce the force necessary to move the gimbal as much as possible and in that manner to reduce the size of the synchros used to move the gimbal to a minimum.

A primary feature of applicants' construction is that the gimbal supporting a plurality of gyros is moved about two axes, perpendicular to one another, the movement about one axis being entirely independent of the movement about the other axis.

A major feature of the construction is that the gimbal is formed in a plurality of sections, one central section being supported so that it can be rotatably displaced about a first axis, the auxiliary sections being supported from the central section in such a manner that they are angularly adjustable relative to the central section about an axis perpendicular to the first axis.

Another feature is that the gimbal movement about both axes is controlled hydraulically and independently, thus assuring positive and rapid response to signals, and a high degree of force to move the gimbal with relatively low control mechanism weight.

Another feature is that backlash is reduced to a minimum, and a high degree of balance maintained by employing control racks and hydraulic actuators, which move in opposite directions in each plane, thereby providing opposite torques, which tend to balance one another.

Another feature is that all hydraulic lines employed are cast directly into the housing, which supports the apparatus, thus reducing weight and machining costs to a minimum.

Another feature is that a low power electronics system, controlled by pick-offs attached to the individual gyros or gimbals, is used, thus eliminating amplifiers and other complex electronic devices normally employed.

A primary feature of the apparatus is that the individual elements of the device are relatively simple and inexpensive to produce, coacting to provide a compact, relatively low cost assembly.

Another important feature of the apparatus is that the entire mechanism is supported by a single housing, the base of the housing having a readily removable cover attached thereto, the cover being so constructed that when it is removed, a major portion of the gyros and other parts of the apparatus are exposed for servicing and repair or individual replacement.

The accompanying drawings, illustrative of one embodiment of the invention and several modifications thereof, together with the description of their construction and the method of operation, control, adjustment, and utilization thereof, will serve to clarify further objects and advantages of the invention.

In the drawings:

FIGURE 1 is a partial vertical section and partial front elevational view of the platform shown in FIGURES 2 and 3, showing the accelerometer and one of the gyros, the section being taken partially on the line 1—1, FIGURE 3.

FIGURE 2 is a partial cross-section and partial plan view of the platform shown in FIGURE 1 showing the racks and control cylinders used for adjusting the angular position of the gimbals about the pitch axis, the section being taken partially on the line 2—2, FIGURE 1.

FIGURE 5 is a cross-section through the shaft supporting the gimbal sections on the pitch axis of the platform, and the gimbal section used in conjunction therewith, showing the method of attaching the gimbal section to the shaft, to reduce backlash to a minimum, the section being taken on the line 5—5, FIGURE 2.

FIGURE 6 is a vertical section through the shaft supporting the auxiliary gimbal sections and the locking pin used in conjunction therewith, the section being taken on the line 6—6, FIGURE 5.

Figure 4:
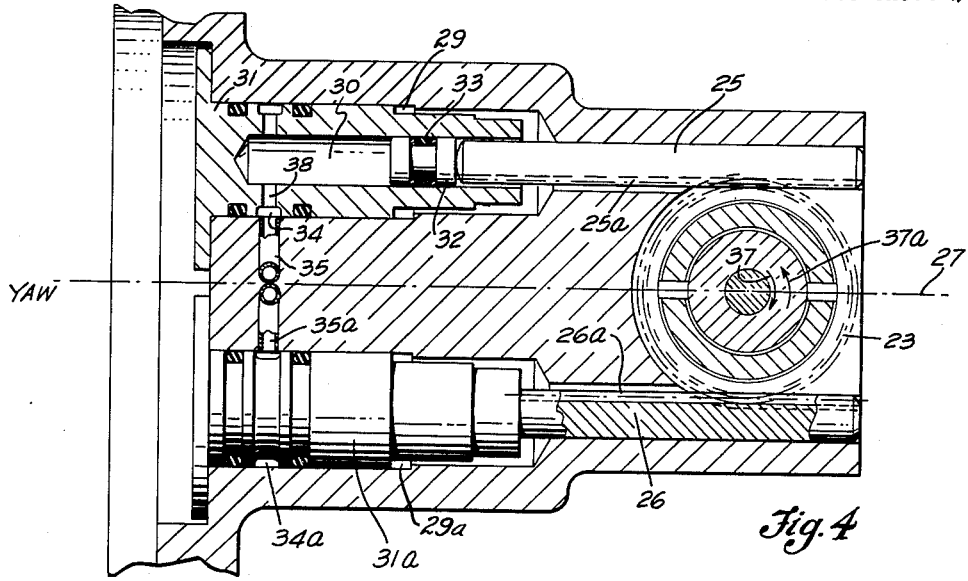
FIGURE 4 is a vertical section through the housing, showing a pair of racks used for rotating the central gimbal section which is mounted on the roll axis of the platform shown in FIGURES 1, 2, and 3, the section being taken on the line 4—4, FIGURE 2.

It will be understood that the following description of the construction and the method of operation, adjustment, control, and utilization of the two-axis hydraulically-controlled platform, is intended as explanatory of the invention and not restrictive thereof.

In the drawings, the same reference numerals designate the same parts throughout the various views, except where otherwise indicated.

One embodiment of the construction shown in FIGURES 1 and 2 is supported by a housing, 10, the housing pivotally supporting a gimbal 9, which is formed in several sections, the gimbal being pivotally and adjustably supported about two axes, a roll axis 12, shown in FIGURE 1, and a pitch axis 14, shown in FIGURES 2 and 3, the gimbal 9 being rotatably adjustable about these two axes in a manner hereinafter described.

Figure 3:
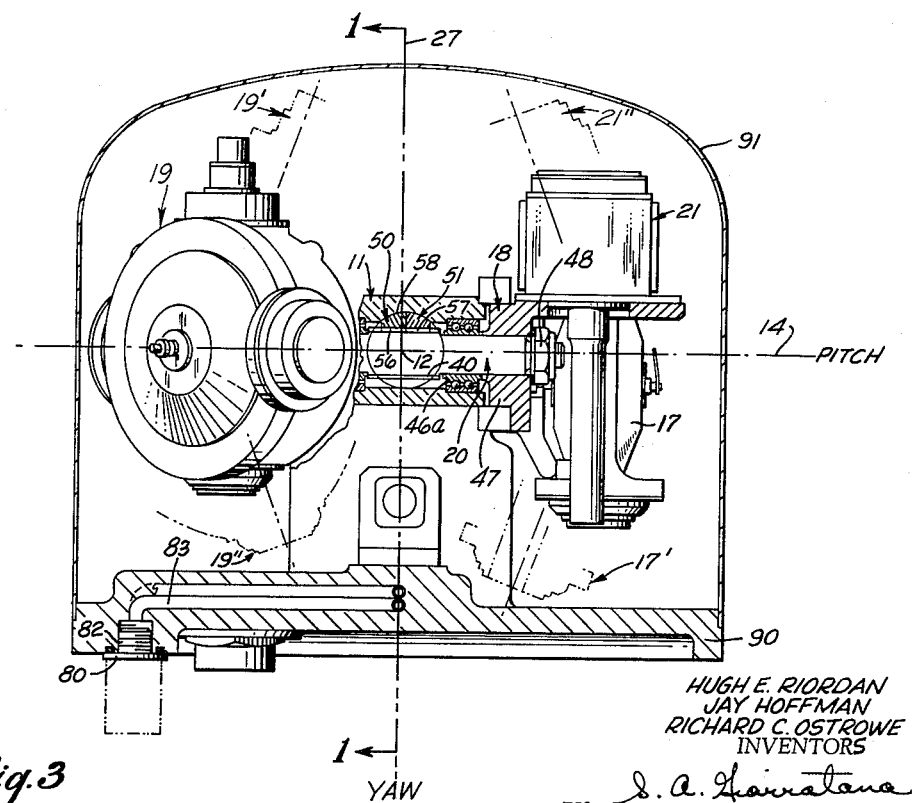
FIGURE 3 is a partial side elevational view and partial vertical section of the platform shown in FIGURES 1 and 2, showing two of the gyros and the accelerometer, the gyros and the accelerometer being shown in angularly displaced positions about the central axis in dot-dash lines, the section being taken on the line 3—3, FIGURE 1.

The gimbal 9 is formed in three sections, a central section 11 shown in FIGURE 2 which is rotatably supported by a pair of insert cylinders fitted to hubs at both ends of the housing, and a pair of auxiliary sections 13 and 18, which are rotatably supported by a central cylindrical shaft 20, which is shown in FIGURES 2 and 3, and hereinafter described in greater detail.

The auxiliary sections 13 and 18 of the gimbal 9 support, respectively, a pitch gyro 16 and a roll gyro 17, which are located in the relative positions shown in FIGURE 2, the gyros functioning in substantially the same manner as those mounted on the conventional type of navigation platform.

The pitch and roll gyros stabilize the platform about their respective axes 14 and 12 in substantially the same manner as those mounted on the conventional platform.

A third gyro, an azimuth gyro 19, is also supported by the auxiliary section 13 of the gimbal 9. This azimuth gyro 19 plays no part in stabilizing the platform, the gyro merely measuring the angular velocity of the gyro about its input axis.

The azimuth gyro, however, being mounted on the gimbal 9, moves with the gimbal 9 and therefore the roll and pitch gyros, when the angular position of the gimbal of the platform is adjusted in the manner hereinafter described.

A two-axis accelerometer 21 is also mounted on one auxiliary section 18 of the gimbal 9, the accelerometer indicating the acceleration of the platform about both the pitch and roll axes 14 and 12.

In order to adjust the rotational angular position of the gimbal 9 and the gyros mounted thereon about the roll axis, a pinion gear 23 is provided at one end of a tubular section 24 of the central section 11 of the gimbal, coaxially with the roll axis 12.

A pair of substantially cylindrical racks 25, 26, is slidably fitted to the housing 10, in the positions shown in FIGURES 2 and 4, the racks being substantially parallel to the yaw axis 27, of the platform as shown in FIGURE 4.

Teeth 25a, 26a of the racks 25, 26, respectively mesh with the gear 23 integral with the gimbal section 24; thus, axial displacement of the racks in mutually opposite directions, accomplished in a manner hereinafter described, turns gear 23 (as shown by arrows 37, 37a, FIGURE 4) and with it, gimbal 9, about axis 12. In FIGURE 3, the normal position of gimbal 9 and mechanically associated components is represented in solid lines; respective angularly displaced positions are shown in broken lines and denoted by primed and double-primed reference numerals.

As best appears in FIGURE 4, each of the racks 25, 26 is moved outwardly in turn (to the right as viewed in this figure) by respective hydraulic actuators 29, 29a. Inasmuch as the hydraulic actuators are the same for both racks, only that associated with rack 25 will be described in detail.

Actuator 29 consists of a substantially cylindrical insert cylinder 31, which is fitted to an opening in the housing 10, co-axially with the rack 25; insert cylinder 31 contains a cylindrical inner chamber 30 open at one end to slidably receive and support the inner end of rack 25.

A piston 32 carrying an O-ring 33 is reciprocably disposed within chamber 30 between its closed end and the inner end of rack 25.

As shown in FIGURE 4, the cylindrical body portion of the insert cylinder 31 has an annular groove 34 around the outer circumference thereof, the groove being in direct communication with a tubular insert 35 in the housing 10; the tubular insert is in direct communication, in a manner hereinafter described, with a roll servo valve 36 (FIGURE 1), which is supported by the housing. Servo valve 36 supplies hydraulic fluid under pressure via conduits 84 and 35 to the annular groove 34 surrounding the insert cylinder 31 and, through the groove, to a port 38 in the insert cylinder. Port 38, which is substantially perpendicular to the longitudinal axis of the rack 25, supplies hydraulic fluid under pressure to the interior 30 of the insert cylinder, thereby forcing the piston 32 outward and moving the rack 25 outward until gimbal 9 is restored from an angularly-displaced position shown by dot-dash lines, FIGURE 3, to the normal position shown in solid lines.

As the racks 25, 26 are parallel to one another and mesh with the pinion gear 23, rack 26 is moved into cylinder 30 by the pinion gear when rack 25 is moved outwardly of cylinder 30a by pressure of hydraulic fluid, and vice versa. The rack moving into its respective actuator cylinder under the action of the pinion gear operates against residual hydraulic pressure therein, thereby eliminating backlash.

As there are two racks 25, 26 both of which are controlled by the roll servo valve 36, the gimbal can be restored to its normal position from either of the angularly displaced positions shown in FIGURE 3, depending upon the passage through which the hydraulic fluid is transmitted to one of the passages 35, 35a in communication with the annular areas surrounding the insert cylinders 31, 31a.

When the gimbal 9 is in its normal position and it is desired to displace it to one of the angularly displaced portions an electrical signal is transmitted to the roll servo valve 36. Hydraulic fluid is transmitted to the appropriate one of the hydraulic actuators 29 or 29a depending upon direction in which it is desired to angularly displace the gimbal.

In order to restore the gimbal to its neutral position when the gimbal 9 is displaced from its neutral position about the pitch axis 14, a gear 40 is cut around the outer circumference of the central shaft 20, which supports the left- and right-hand auxiliary sections 13, 18 of the gimbal 9, shown in FIGURES 2 and 3.

The shaft 20 is supported by the central tubular section 11 of the gimbal 9; a pair of anti-friction bearings 46, 46a, supported by the tubular sections of the gimbal 9, rotatably supporting the shaft 20 and the two auxiliary sections 13, 18 of the gimbal 9 attached thereto.

Each auxiliary section 13, 18 of the gimbal 9 has a hub 47, 47a integral therewith, coaxially fitted onto a respective end of the shaft 20. Respective nuts 48, 48a or other type of clamp means, threaded onto the ends of the shaft 20, clamp the hubs 47, 47a of the gimbal sections 13, 18 to the shaft.

As shown in FIGURES 2 and 3, parallel racks 50, 51 having oppositely extending cylindrical extensions 68, 68a are fitted to the tubular sections 24, 24a of the central section of gimbal 9, by means of respective pairs of longitudinally-spaced cylindrical support sections 52, 52a and 53, 53a. The cylindrical support sections of each rack are slidably supported by central cylindrical areas 54, 55 in tubular sections 24, 24a, respectively, of the gimbal.

As shown in FIGURE 2, racks 50, 51 are parallel to the longitudinal axes of the insert cylinders 59, 59a and to the roll axis 12 of the platform. The central portions of the two racks are nominally aligned with and parallel to one another. One cylindrical support section 52 of rack 50 is slidably fitted to the cylindrical area 55 and the other cylindrical support section 52a of this rack is slidably fitted to the cylindrical area 54. Similarly, one cylindrical support section 53 of rack 51 is slidably fitted to the cylindrical area 54, in the left-hand tubular section 24a of the gimbal and other cylindrical support section 53a is slidably fitted to the opposite cylindrical area 54, of the tubular section 24 of the gimbal.

As shown in FIGURE 3, the central section of each rack 50, 51 has teeth 56, 57 cut into the face thereof, directed toward the gear 40, integral with the gimbal pivot shaft 20, the inner surface of the central gimbal section 11 having a circular segmental area 58 formed therein to retain the teeth of the racks 50, 51 in continuous engagement with the gear.

Insert cylinders 59, 59a are inserted through respective central hubs 60, 60a at the ends of the housing 10, as shown in FIGURES 2 and 3. Insert cylinders 59, 59a have annular grooves 61, 61a, respectively, around their outer circumferences. As shown in FIGURE 1, each of the grooves 61, 61a is in direct communication with one of the tubular passage inserts 62, 63 cast into or otherwise provided in housing 10, the tubular passages being in direct communication with a pitch servo valve 64, which supplies hydraulic fluid under pressure to the grooves. From grooves 61, 61a hydraulic fluid passes through ports 65, 65a which are perpendicular to the longitudinal axis of the insert cylinder and the roll axis 12 of the gimbal 9, the ports being in direct communication with the interiors 66, 66a, respectively of the insert cylinders.

Substantially cylindrical pistons 67, 67a carrying peripheral O-rings 71, 71a, respectively, are slidably disposed in the respective interior chambers 66, 66a of the insert cylinders. Pistons 67, 67a engage the respective free ends of cylindrical extensions 68, 68a when hydraulic fluid under pressure is fed through ports 65, 65a in insert cylinders 59, 59a to the interiors thereof, thus positively displacing rack 51 to the right and rack 50 to the left as viewed in FIGURE 2.

Anti-friction bearings 70, 70a fitted in the ends of the cylindrical sections 24a, 24, respectively, of the central gimbal section 11, journal insert cylinders 59, 59a, therein, thus allowing free rotation of the gimbal section relative thereto.

Each insert cylinder 59, 59a has a pair of annular grooves 72, 72a containing respective O-rings 73, 73a, or other type of packing to seal between the inserts and hubs 60, 60a.

Servo valve 64 is under control of a solenoid (not shown) operation of which, in response to an electric signal, determines which of the two passages 62 and 63 is to receive hydraulic fluid under pressure via conduit 75. Hydraulic pressure fluid supplied to passage 62 flows via groove 61 and port 65 into the interior 66 of insert cylinder 59 driving piston 67 to the right (as viewed in FIG. 2) and, with it, rack 51. Movement of rack 51 in this manner causes gear 40, and with it shaft 20, to rotate clockwise, as viewed and indicated by arrow 76 in FIGURE 1. At the same time, gear 40 drives rack 50 to the right, as viewed in FIGURE 2, moving piston 67a toward top center position in cylinder chamber 66a. When hydraulic fluid is supplied to passage 63, it flows via groove 61a and port 65a, into chamber 66a, causing oppositely directed displacement of racks 50, 51 and rotation of gear 40 and shaft 20 as indicated by arrow 76a, FIGURE 1.

Thus it will be seen that gimbal sections 13, 18, and the gyros mounted thereon, may be selectively angularly displaced about pitch axis 14 in response to signals supplied to servo valve 64.

As racks 50, 51 and their associated hydraulic actuation assemblies are substantially axially aligned, oppositely-acting, and symmetrically disposed with respect to pitch axis 14, the load on gear 40 is balanced eliminating backlash.

Referring to FIGURE 1, fluid passages 78, 79 are provided between the pitch servo valve 64 and the roll servo valve 36, to allow hydraulic fluid under pressure, supplied from an external source (not shown) through hydraulic couplings 80, 81, to flow to either valve as required for transmission to the hydraulic actuators controlled thereby.

One of the hydraulic couplings 80, 81 is shown in additional detail in, and will now be described with reference to, FIGURE 3.

A reduced diameter stem 82, integral with the hydraulic coupling 80 is threadably fitted to an opening in the housing 10, the opening being in direct communication with a tubular insert passage 83 cast into the housing 10; tubular passage 83 is in communication with tubular passage 78 connecting the pitch servo valve 64 to the roll servo valve 36, thereby supplying hydraulic fluid under pressure to both.

All of the tubular passages 62, 78, 79, 83 fitted to the housing 10 are in the form of tubes of brass, an aluminum alloy or other material, which are cast in place in the housing. This assures accurate passages from both servo valves 64, 36 to the respective internal cylinders 66, 66a, controlled thereby, and prevents leakage of hydraulic fluid through the passages 62, 78, 79, 83.

As shown in FIGURE 2, the central section 11 of the gimbal has a pair of roll pick-offs 86, 87 attached thereto, the pick-offs being equally spaced relative to the roll axis of the platform, the pick-offs 86, 87 being adapted to indicate the angular displacement of the gimbal 9 and the gyros supported thereby relative to the roll axis 12.

An electrical signal received from the pick-offs 86, 87 is transmitted to a control solenoid fitted to the roll servo valve, to control the flow of hydraulic fluid through the roll servo valve, thereby to control the movement of the gimbal 9 about the roll axis 12 in the manner hereinbefore described.

As shown in FIGURES 2 and 3, a similar pair of pitch pick-offs 88, 89, is attached to one auxiliary section 18 of the gimbal, on opposite sides of the pitch axis 14. The pitch axis pick-offs 88, 89 provide an electrical signal which indicates the angular displacement of the gimbal relative to the pitch axis 14.

An electrical signal received from the pick-offs 88, 89 is transmitted to a control solenoid incorporated in the pitch servo valve, to control the flow of hydraulic fluid through the pitch servo valve 64, thereby to control the restoral movement of the gimbal about the pitch axis of the platform, in the manner hereinbefore described.

A relatively flat base 90 of substantially circular cross-section is integral with the lower end of the housing 10.

As shown in FIGURE 1, a hollow cupped cover 91, formed of thin sheet metal, is fitted to a reduced diameter section of the outer circumference of the base 90, and attached thereto by suitable means.

As shown in FIGURE 2, when the cover 91 is removed from the base 90 of the housing, the gimbal sections 11, 13 and 18, the two gyros 16, 17, the accelerometer 21 and the azimuth gyro 19, are fully exposed. This renders it possible to replace either of the two gyros 16, 17, the accelerometer 21, or the azimuth gyro 19, in the event any defects develop in a particular component, without disturbing the gimbal sections 11, 13 and 18 or the hydraulic control mechanisms, hereinbefore described, in any manner.

Gimbal section 13 contains a bore 94, adapted to receive shaft 20. Bore 94 is chordally intersected at right angles by a second bore, 95, in gimbal section 13. The end portion of shaft 20 which extends into bore 94 is provided with a flat of lesser chordal dimension than the plane of intersection of bores 94 and 95 so that the flat is in a plane chordally intersecting rather than tangent to the wall of bore 95. A locking pin 96, adapted to be slidably received in bore 95, has a tapered surface engageable with flat 93 to preclude relative rotation between shaft 20 and gimbal section 13. Bore 95 is enlarged and threaded at one end to receive headless screw 98 which forces pin 96 into the bore to achieve and maintain locking engagement between flats 93 and 97.

Gimbal section 18 is fixed to the opposite end of shaft 20 by means of a similar tapered-pin locking arrangement not shown.

It will be apparent to those skilled in the art, that the present invention is not limited to the specific details described above and shown in the drawings, and that various modifications are possible in carrying out the features of the invention and operation, actuation and the method of control and utilization thereof, without departing from the spirit and scope of the appended claims.

What is claimed is:

1. In a multiple axis navigation platform comprising a housing, a multiple-section gimbal supported by said housing and having a central section, means supported by the housing rotatably supporting the central section of the gimbal about one axis of the platform, a pair of auxiliary sections located adjacent the central section of the gimbal, and means, rotatably supported by the central section, supporting the auxiliary sections of the gimbal, the axis of rotation of the auxiliary sections being aligned with a second axis of the platform substantially perpendicular to the first axis thereof, a plurality of gyros supported by the auxiliary sections of the gimbal, one of said gyros being directed parallel to the first axis of the platform and a second of said gyros being directed parallel to said second axis of the platform, remotely controllable means operative to control rotational displacement of the central section of the gimbal about its axis of rotation, and remotely controllable means operative to control the rotational displacement of the auxiliary sections of the gimbal about said second axis, portions of the central section of the gimbal being substantially tubular, of circular cross-section, one tubular portion of the central gimbal section having gear teeth cut around the outer circumference thereof, a pair of substantially parallel racks slidably supported by the housing in a plane substantially perpendicular to the axis of rotation of the central gimbal section, a hollow substantially cylindrical support member fitted to the housing in axial alignment with each of the racks, each of the racks having gear teeth on one face thereof, the teeth meshing with the teeth of the gear formed on the tubular portion of the central section of the gimbal, the racks being adapted to rotatably angularly displace the central section of the gimbal in opposite directions, depending upon the selected rack, which is moved outward toward the central section of the gimbal, each cylindrical support member having an internal closed end cylinder, co-axial with the corresponding rack, a free cylindrical piston slidably fitted to each of the internal cylinders, one end of the piston being adapted to engage the adjacent end of the rack, electrical controlled valve means operative to selectively supply hydraulic fluid under pressure to the internal cylinder aligned with each of the racks, tubular passage means supported by the housing operative to selectively transmit hydraulic fluid under pressure to the internal cylinder aligned with each of the racks, the hydraulic fluid in each internal cylinder being operative to move the adjacent rack outward toward the gear on the tubular portion of the central gimbal, thereby to rotatably angularly displace the central gimbal, electrical pick-off means attached to the central gimbal on opposite sides of the axis of rotation thereof, said pick-off means operative to indicate the rotational angular displacement of the central gimbal relative to the neutral position thereof, electrical signal means operative to engage the individual pick-off means, to indicate the direction and extent of the rotational angular displacement of the central gimbal about its axis of rotation, said valve means having electrical control means incorporated therewith, and means connecting the electrical control means of the valve to the pick-off signal means, the valve means being operative to supply hydraulic fluid to the selected internal cylinder, thereby to restore the central gimbal to its neutral position from the angularly displaced position thereof.

2. In combination, a multiple axis navigation platform, the means supporting the central section of the gimbal being a pair of axially aligned cylindrical members supported by the housing, a substantially cylindrical central shaft rotatably supported by the central section of the gimbal, the two auxiliary sections of the gimbal being fixedly attached to the central shaft, the cylindrical shaft being co-axial with the second axis of the platform, substantially perpendicular to the first axis thereof, a portion of the shaft having gear teeth around the outer circumference thereof, a pair of substantially parallel racks mounted within the central section of the gimbal, means formed in the central section of the gimbal operative to independently slidably support the racks, the racks being parallel to the axis of rotation of the central section of the gimbal, each of said racks having teeth on one face thereof, operative to mesh with the teeth of the gear of the central shaft to rotate the central shaft, each of the cylindrical members having a closed end internal cylinder therein, concentric with the cylindrical member, each of the racks having a substantially cylindrical extension integral therewith, each of said cylindrical extensions being directed away from the central shaft, each cylindrical extension being in co-axial alignment with and slidably supported by the internal cylinder of one of the cylindrical members, a free cylindrical piston slidably fitted to the internal cylinder in each of the cylindrical members, one end of each piston being adapted to engage the adjacent end of the cylindrical extension of the corresponding rack, electrically controlled valve means operative to selectively supply hydraulic fluid under pressure to the internal cylinder, supporting the cylindrical extension of each of the racks, tubular passage means supported by the housing operative to selectively transmit hydraulic fluid under pressure, to the internal cylinder supporting the extension of each of the racks, the hydraulic fluid in each internal cylinder being operative to move the cylindrical extension, and the rack integral therewith, centrally toward the central shaft, thereby to rotatably angularly displace the gear on the central shaft, electrical pick-off means attached to one of the auxiliary gimbal sections operative to indicate the rotational angular displacement of the auxiliary gimbal sections, said pick-off means being operative to indicate the rotational angular displacement of the auxiliary gimbals, relative to the neutral position thereof, electrical signal means operative to engage the individual pick-off means to indicate the direction and extent of the rotational angular displacement of the auxiliary gimbal sections about the axis of rotation of the central shaft, said valve means having electrical control means incorporated therewith, and means connecting the electrical control means of the valve to the electrical pick-off signal means, the valve means being operative to supply hydraulic fluid under pressure to the selected internal cylinder, thereby to longitudinally displace one of the racks, and restore the auxiliary gimbal sections to their neutral position from the angularly displaced position thereof.

3. In combination, a multiple axis navigation platform, the means supporting the central section of the gimbal being a pair of co-axially aligned substantially cylindrical support members, the means rotatably supported by the central section of the gimbal being a substantially cylindrical central shaft, a pair of auxiliary gimbals attached to opposite ends of the central shaft, each of said auxiliary gimbals having a hub integral therewith, the hub being co-axial with the central shaft, each of said hubs having a central substantially circular opening therethrough, each opening being fitted to a portion of the outer circumference of the central shaft, adjacent one end of the central shaft, the hub of each auxiliary gimbal having a substantially circular secondary opening therethrough, the longitudinal axis of said secondary opening being substantially perpendicular to the longitudinal axis of the central shaft, a substantially cylindrical pin inserted through each secondary opening, the pin having a flat formed thereon, said flat being angularly displaced relative to the longitudinal axis of the secondary opening, the outer circumference of the central shaft having a flat formed thereon, and straddling the pin inserted through the hub of the auxiliary gimbal section, the angle of said flat on the central shaft relative to the longitudinal axis of the pin being substantially equal to the angle between the flat on the pin and the longitudinal axis of the pin, the hub of each auxiliary gimbal having an internally threaded enlarged opening therethrough, axially aligned with and extending beyond the auxiliary opening, and a headless set screw threadably fitted to the internally threaded enlarged opening, said set screw being operative to force the cylindrical pin inward toward the central shaft, thereby to force the angularly positioned flat on the pin against the flat on the central shaft and reduce to a minimum the play between the hub of the auxiliary gimbal and the central shaft.

4. In combination, a multiple axis navigation platform, the means supporting the central section of the gimbal being a pair of axially aligned cylindrical members supported by the housing, a substantially cylindrical central shaft rotatably supported by the central section of the gimbal, the two auxiliary sections of the gimbal being fixedly attached to the central shaft, the central cylindrical shaft being co-axial with the second axis of the platform, substantially perpendicular to the first axis thereof, a portion of the central shaft having gear teeth around the outer circumference thereof, a pair of substantially parallel racks reciprocally mounted within the central section of the gimbal, means formed on the central section of the gimbal operative to independently slidably support the racks, the racks being parallel to the axis of rotation of the central section of the gimbal, each of said racks having teeth in the face thereof directed toward the central shaft, said teeth meshing with the gear on the central shaft to rotate the central shaft, each of the cylindrical members having a closed end internal cylinder therein, concentric with the cylindrical member, each of the racks having a substantially cylindrical extension integral therewith, each of said cylindrical extensions being directed away from the central shaft, each cylindrical extension being in co-axial alignment with and slidably supported by the internal cylinder of one of the cylindrical members, a free cylindrical piston slidably fitted to the internal cylinder in each of the cylindrical members, one end of each piston being adapted to engage the cylindrical extension of the corresponding rack, each of the cylindrical members having a passage therethrough in communication with the internal cylinder thereof, valve means operative to selectively supply hydraulic fluid under pressure to the internal cylinder supporting the cylindrical extension of each of the racks, the housing being formed of a cast material, a plurality of passage tubes cast into the housing connecting the valve means with the passage through each cylindrical member leading to the internal cylinder thereof, said passage tubes being adapted to selectively transmit hydraulic fluid from the valve means to the internal cylinder supporting the extension of each of the racks, the hydraulic fluid in each internal cylinder being operative to move the cylindrical extension and the rack integral therewith toward the central shaft, thereby to rotatably angularly displace the central shaft, and the auxiliary gimbal sections attached thereto.

5. A multiple axis navigation platform comprising a housing, a multiple-section gimbal supported by said housing and having a central section, means supported by the housing rotatably supporting the central section of the gimbal about one axis of the platform, a pair of auxiliary sections located adjacent the central section of the gimbal, and means, rotatably supported by the central section, supporting the auxiliary sections of the gimbal, the axis of rotation of the auxiliary section being aligned with a second axis of the platform substantially perpendicular to the first axis thereof, a plurality of gyros supported by the auxiliary sections of the gimbal, one of said gyros being directed parallel to the first axis of the platform and a second of said gyros being directed parallel to said second axis of the platform, remotely controllable means operative to control rotational displacement of the central section of the gimbal about its axis of rotation, and remotely controllable means operative to control the rotational displacement of the auxiliary sections of the gimbal about said second axis, in which portions of the central section of the gimbal are tubular, of substantially circular cross-section, one tubular portion of the central gimbal section having gear teeth cut around the outer circumference thereof, a pair of substantially parallel racks slidably supported by the housing in a plane substantially perpendicular to the axis of rotation of the central section of the gimbal, an open-ended substantially cylindrical support member fitted to the housing in axial alignment with each of the racks, each of the racks having gear teeth on the face thereof directed toward the tubular portion of the central gimbal section, the teeth meshing with the teeth of the gear formed on the tubular portion of the central section of the gimbal, the racks being adapted to rotatably angularly displace the central section of the gimbal in opposite directions, depending upon the selected rack, which is moved outward toward the central section of the gimbal, each cylindrical support member having an internal closed-end cylinder therein, co-axial with the corresponding rack, a free substantially cylindrical piston slidably fitted to each of the internal cylinders, one end of each piston being adapted to engage the adjacent end of the corresponding rack, valve means operative to selectively supply hydraulic fluid under pressure to the internal cylinder supporting each of the racks, each cylindrical member having a passage therethrough connecting the outer circumference of the cylindrical member with the internal cylinder therein, the housing being formed of a cast material, a plurality of preformed passage tubes, cast into the housing, the passage tubes connecting the valve means with the passage through each cylindrical member leading to the internal cylinder thereof, said passage tubes being adapted to selectively transmit hydraulic fluid under pressure from the valve means to the internal cylinder guiding each of the racks, the hydraulic fluid in each internal cylinder being operative to move the rack fitted to the internal cylinder toward the central section of the gimbal, thereby to rotatably angularly displace the tubular portion of the central gimbal section and the auxiliary sections of the gimbal supported thereby.

6. A gyro-stabilized navigation platform, comprising:
   a reference structure;
   an articulated gimbal having a first elongate section mounted on said structure for rotational displacement about its longitudinal axis and a second gimbal section extending transversely of, and journalled on, the first gimbal section for rotational displacement about a second axis substantially perpendicular to the first said axis;

a plurality of gyros fixedly mounted on said second gimbal section including one gyro having its spin axis in a plane perpendicular to said first axis and a second gyro having its spin axis in a plane perpendicular to said second axis;

means including a hydraulic servo system operative in response to angular displacement of the spin axis of said one gyro about said first axis to control rotation of said first gimbal section about said first axis; and additional means including a second hydraulic servo system operative in response to angular displacement of the spin axis of said second gyro about said first axis to control rotation of said second gimbal section about said second axis, said means and additional means coacting to maintain substantially constant the orientation of said second gimbal section with respect to inertial space, said means and said additional means for rotation control including:

respective pinion gear means on said gimbal sections mounted coaxially with the axis of rotational displacement thereof;

a pair of oppositely-acting rack gears meshing with each of said pinion gears;

oppositely-acting hydraulic actuators for translational displacement of each pair of rack gears;

and a servo valve for each pair of rack gears operative to control the hydraulic actuators for said rack gears.

7. A gyro-stabilized navigation platform, comprising:
a reference structure;
an articulated gimbal having a tubular section mounted on said structure for rotational displacement about its longitudinal axis, a shaft extending through and journalled in said tubular gimbal section with its longitudinal axis orthogonal to that of the tubular gimbal section, and auxiliary gimbal members fixed to said shaft on opposite sides of said tubular gimbal section;

a first gyro fixedly mounted on one of said auxiliary gimbal members with its spin axis in a plane perpendicular to the rotational axis of said tubular section;

a second gyro fixedly mounted on the other of said auxiliary gimbal members with its spin axis in a plane perpendicular to the rotational axis of said rod;

a coaxial pinion gear adjacent one end of said tubular gimbal section;

a pair of substantially parallel rack gears mounted on said reference structure for axial translation relative thereto and meshing with said pinion gear on opposite sides of its axis of rotation;

respective hydraulic actuators for said rack gears individually operative to positively displace said racks in the same direction;

hydraulic means, including a servo valve, operative in response to angular displacement of the spin axis of the first gyro in one direction about said tubular section axis to operate one of said hydraulic actuators, and, in response to angular displacement of the spin axis in the opposite direction, to operate the other of said hydraulic actuators;

a second pinion gear, coaxial with and fixedly disposed on said shaft within said tubular gimbal section;

a second pair of rack gears mounted within the tubular gimbal section for axial displacement longitudinally thereof, the rack gears of said second pair being laterally offset with respect to another, each meshing with said second pinion gear on the same side of its rotational axis;

respective additional hydraulic actuators for the rack gears of said second pair individually operative to positively displace said racks in opposite directions; and additional hydraulic means, including a second servo valve, operative in response to angular displacement of the spin axis of said second gyro in one direction about said rod axis to operate one of said additional hydraulic actuators, and, in response to angular displacement of the axis in the opposite direction, to operate the other of said additional hydraulic actuators, said hydraulic means and additional hydraulic means coacting to maintain substantially constant the orientation of said second gimbal section with respect to inertial space.

8. A gyro-stabilized navigation platform according to claim 7 including an azimuth gyro mounted on one of said auxiliary gimbal members.

9. A gyro-stabilized navigation platform, comprising:
a housing structure including a base plate having a pair of spaced mounting projections containing coaxially aligned apertures;

respective hollow cylindrical members, closed at one end, extending through said apertures with their open ends projecting therethrough towards one another;

an articulated gimbal including a tubular section receiving and journalled at its ends on the projecting end of said cylindrical members, a shaft extending through and journalled in the tubular section with its axis orthogonal to that of the tubular gimbal section, and auxiliary gimbal members fixed to said shaft on opposite sides of said tubular section;

a first gyro fixedly mounted on one of said auxiliary gimbal members with its spin axis in a plane perpendicular to the rotational axis of said tubular section;

a second gyro fixedly mounted on the other of said auxiliary gimbal members with its spin axis in a plane perpendicular to the rotational axis of said shaft;

a coaxial pinion gear adjacent one end of said tubular gimbal section;

a pair of substantially parallel rack gears mounted on said housing structure in one of said spaced mounting projections for axial translation in parallel paths defining a plane substantially perpendicular to said tubular gimbal section, said rack gears meshing with said pinion gear on opposite sides of its axis of rotation;

respective hydraulic actuators in said one mounting projection individually operative to positively displace said rack members in a direction away from the base plate;

hydraulic means, including a servo valve, operative in response to angular displacement of the spin axis of said first gyro in one direction about said tubular section axis to operate one of said hydraulic actuators, and, in response to angular displacement of the spin axis in the opposite direction, to operate the other of said hydraulic actuators;

a second pinion gear, coaxial with and fixedly disposed on said shaft within said tubular gimbal section;

a second pair of rack gears mounted within the tubular gimbal section for axial displacement longitudinally thereof, the rack gears of said second pair being laterally offset with respect to another, each meshing with said second pinion gear on the same side of its rotation axis and having respective, oppositively extending cylindrical projections slidably received in the open ends of said hollow cylindrical members;

respective hydraulic pistons coaxially slidably disposed in said cylindrical members and coacting therewith to define additional hydraulic actuators individually operative to positively displace said rack gears in opposite directions; and additional hydraulic means, including a second servo valve, operative in response to angular displacement of the spin axis of said second gyro in one direction about said shaft axis to operate one of said additional hydraulic actuators, and, in response to angular displacement of the axis in the opposite direction, to operate the other of said additional hydraulic actuators, said hydraulic means and additional hydraulic means coacting to maintain substantially constant the orientation of said second gimbal section with respect to inertial space.

References Cited by the Examiner

UNITED STATES PATENTS

| | | | |
|---|---|---|---|
| 1,545,812 | 7/1925 | Chessin | 74—5.34 X |
| 2,606,448 | 8/1952 | Norden et al. | 74—5.34 |
| 2,900,824 | 8/1959 | Barnes | 74—5.34 |

FOREIGN PATENTS 544,756   4/1942   Great Britain.

BROUGHTON G. DURHAM, *Primary Examiner.*

T. W. SHEAR, *Assistant Examiner.*